(12) United States Patent
Marinescu et al.

(10) Patent No.: US 12,271,908 B2
(45) Date of Patent: Apr. 8, 2025

(54) AUTOMATED SYSTEM FOR CUSTOMER SUPPORT

(71) Applicant: International Business Machines Corporation, Armonk, NY (US)

(72) Inventors: Radu Marinescu, Dublin (IE); Akihiro Kishimoto, Setagaya (JP); Yufang Hou, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 17/370,092

(22) Filed: Jul. 8, 2021

(65) Prior Publication Data

US 2023/0008218 A1 Jan. 12, 2023

(51) Int. Cl.
*G06Q 30/016* (2023.01)
*G06F 40/205* (2020.01)
(Continued)

(52) U.S. Cl.
CPC ......... *G06Q 30/016* (2013.01); *G06F 40/205* (2020.01); *G06F 40/279* (2020.01);
(Continued)

(58) Field of Classification Search
CPC ........... G06Q 30/016; G06Q 10/06316; G06Q 10/103; G06F 40/284; G06F 16/3329;
(Continued)

(56) References Cited

U.S. PATENT DOCUMENTS 8,442,563 B2   5/2013   Chen
8,639,638 B2   1/2014   Shae
(Continued)

FOREIGN PATENT DOCUMENTS

WO   2018195307 A1   10/2018

OTHER PUBLICATIONS

Arora et al., "Extracting Domain Models from Natural-Language Requirements: Approach and Industrial Evaluation", Proceedings of the ACM/IEEE 19th International Conference on Model Driven Engineering Languages and Systems, Oct. 2016, 11 Pages.
(Continued)

*Primary Examiner* — Rutao Wu
*Assistant Examiner* — Letoria G Knight
(74) *Attorney, Agent, or Firm* — Nicholas A. Welling

(57) ABSTRACT

In an approach for building an automated customer support system, a processor receives a set of sentences extracted from a natural language conversation occurring between an IT support system and a user. A processor extracts an initial state and a goal state from the set of sentences using a Natural Language Classifier. A processor extracts one or more actions from the set of sentences. A processor creates a formal planning model. A processor determines the one or more formal actions are not complete using a first machine learning model. A processor completes the one or more formal actions with one or more missing parts. A processor produces an executable plan using a planner. A processor implements one or more executable scripts according to a sequence of the one or more formal actions of the executable plan using a plan executor.

18 Claims, 3 Drawing Sheets

(51) Int. Cl.
*G06F 40/279* (2020.01)
*G06N 20/00* (2019.01)
*G06Q 10/0631* (2023.01)
*G06Q 10/0633* (2023.01)
*G06Q 10/10* (2023.01)
*G06F 16/23* (2019.01)

(52) U.S. Cl.
CPC ....... *G06N 20/00* (2019.01); *G06Q 10/06316* (2013.01); *G06Q 10/0633* (2013.01); *G06Q 10/103* (2013.01); *G06F 16/23* (2019.01)

(58) Field of Classification Search
CPC .......... G06F 40/30; G06F 16/23; G06F 40/35; G10L 15/063; G06N 20/00
USPC ....................... 705/7.26; 706/12; 704/251, 9; 707/E17.068
See application file for complete search history.

(56) References Cited

U.S. PATENT DOCUMENTS

| | | | |
|---|---|---|---|
| 9,633,317 B2 | 4/2017 | Gabel | |
| 10,860,629 B1* | 12/2020 | Gangadharaiah | G06F 16/3329 |
| 11,005,786 B2* | 5/2021 | Zhang | G06F 40/20 |
| 11,475,488 B2* | 10/2022 | Copeland | H04M 3/5133 |
| 11,706,339 B2* | 7/2023 | Adibi | H04M 3/5166 |
| | | | 705/304 |
| 2014/0379615 A1* | 12/2014 | Brigham | G06N 3/126 |
| | | | 706/11 |
| 2015/0379430 A1* | 12/2015 | Dirac | G06N 20/00 |
| | | | 706/12 |
| 2018/0131645 A1* | 5/2018 | Magliozzi | G06F 40/30 |
| 2019/0042988 A1* | 2/2019 | Brown | G06F 16/9535 |
| 2019/0108470 A1* | 4/2019 | Jain | G06Q 10/063118 |
| 2019/0188583 A1* | 6/2019 | Appel | G06N 5/04 |
| 2019/0287517 A1* | 9/2019 | Green | H04M 3/2281 |
| 2019/0332676 A1* | 10/2019 | Wooters | G06F 40/40 |
| 2019/0392813 A1* | 12/2019 | Jiang | G10L 13/047 |
| 2020/0012954 A1 | 1/2020 | Botea | |
| 2020/0137002 A1* | 4/2020 | Chavda | G06N 20/00 |
| 2020/0167134 A1* | 5/2020 | Dey | G06F 8/65 |
| 2020/0184268 A1* | 6/2020 | Lewis | G06N 20/00 |
| 2020/0226475 A1* | 7/2020 | Ma | G06N 3/047 |
| 2020/0401878 A1* | 12/2020 | Hewitt | G06N 3/044 |
| 2021/0081819 A1* | 3/2021 | Polleri | G06N 5/022 |
| 2021/0160372 A1* | 5/2021 | McGann | H04M 3/5183 |
| 2021/0328888 A1* | 10/2021 | Rath | H04L 41/5074 |
| 2021/0357378 A1* | 11/2021 | Urdiales | G06N 3/08 |
| 2022/0308943 A1* | 9/2022 | Srinivasan | G06F 40/40 |
| 2023/0013842 A1* | 1/2023 | Sait M A | H04L 51/02 |

OTHER PUBLICATIONS

Ghosh et al., "Automatically Extracting Requirements Specifications from Natural Language", arXiv:1403.3142v1 [cs.CL], Mar. 13, 2014, 29 Pages.

Lindsay et al., "Framer: Planning Models from Natural Language Action Descriptions", Proceedings of the Twenty-Seventh International Conference on Automated Planning and Scheduling, ICAPS, Association for the Advancement of Artificial Intelligence, 2017, 9 Pages.

Miglani et al., "NL to PDDL: One-Shot Learning of PDDL Models from Natural Language Process Manuals", ICAPS'20 Workshop on Knowledge Engineering for Planning and Scheduling (KEPS'20) ICAPS, 2020, 10 Pages.

Sacks, Raphael, "Use natural language processing to automate customer support", Medium, Mar. 1, 2019, 5 Pages.

Stephen, Lloyd, "Automate Trouble Ticketing Management with Natural Language Processing", Capgemini US, Dec. 9, 2016, 5 Pages.

* cited by examiner

AUTOMATED SYSTEM FOR CUSTOMER SUPPORT

BACKGROUND OF THE INVENTION

The present invention relates generally to the field of data processing, and more particularly to an automated customer support system.

A customer support system is a source of technical support for an end user of hardware or software. A help desk of a customer support system has traditionally been staffed by a customer service team who interacts with end users contacting the help desk after experiencing some sort of IT issue. The customer service team handles incoming incidents and service requests by documenting the end user's IT issue and opening an IT support ticket.

A new comprehensive customer support system has replaced this antiquated operational model. The new comprehensive customer support system streamlines the customer service process by automating the help desk's ticketing process using IT ticketing software. IT ticketing software orchestrates the streamlined, automated workflows, enabling much faster and hassle-free resolution of incidents and service requests logged as IT support tickets. Each IT support ticket documents all of the relevant information pertaining to the incident that needs to be resolved or the service that is requested of the customer service team. IT ticketing software leverages multiple channels to collect and log IT support tickets, including emails, phone calls, self-service portals, mobile applications, live chats, chatbots, and integration with third-party applications. IT ticketing software routes the IT support tickets throughout their life cycle depending on the predefined workflows and automations to which they are subjected.

In order to provide the streamlined, automated workflows and resolutions of incidents and service requests, IT ticketing software leverages artificial intelligence (AI) and natural language processing (NLP).

A branch of AI known as planning automates reasoning about plans, most importantly the reasoning that goes into formulating a plan to achieve a given goal in a given situation. AI planning is model based. That means the AI planning system takes as an input a description of the initial situation, the actions available to change it, and computes a plan composed of those actions to accomplish the goal when executed.

NLP yields insights into the problems driving IT support tickets that might otherwise go unnoticed and unaddressed. NLP yields insights from the unstructured text in the IT support tickets. NLP algorithms go through the unstructured text and "cluster" issues based on the unstructured text specified in the IT support ticket. NLP algorithms include ways to remove "stop words" such as "the", "a", and "an" in unstructured text fields. NLP algorithms cluster details about IT support tickets by two-word pairs that are included in a large volumes of uncategorized IT support tickets. An example of a two-word pair may be "account lockout" or "access denied." On the other hand, if the system includes incident data from log files, an example of a two-word pair may be "incorrect format" or "command failed."

SUMMARY

Aspects of an embodiment of the present invention disclose a method, computer program product, and computer system for building an automated customer support system. A processor receives a set of sentences extracted from a natural language conversation occurring between an IT support system and a user. A processor extracts an initial state and a goal state from the set of sentences using a Natural Language Classifier. A processor extracts one or more actions from the set of sentences. A processor creates a formal planning model incorporating the initial state, the goal state, and one or more formal actions. A processor determines the one or more formal actions are not complete using a first machine learning model. A processor completes the one or more formal actions with one or more missing parts. A processor produces an executable plan using a planner. A processor implements one or more executable scripts according to a sequence of the one or more formal actions of the executable plan using a plan executor.

In some aspects of an embodiment of the present invention, a processor runs a seq2seq model that translates the sentence identified as the initial state and the sentence identified as the goal state into a logical expression. A processor adds a corresponding logical expression to the sentence identified as the initial state and a corresponding logical expression to the sentence identified as the goal state.

In some aspects of an embodiment of the present invention, a processor extracts a name of each of the one or more actions from the set of sentences. A processor extracts a reason for taking each of the one or more actions from the set of sentences. A processor runs a semantic parser on the set of sentences to detect state transitions when the one or more actions from the set of sentences are applied. A processor extracts one or more pre-conditions and one or more effects of the one or more actions from the set of sentences. A processor converts the one or more actions from the set of sentences written in natural language into one or more formal actions written in planning domain description language.

In some aspects of an embodiment of the present invention, a processor produces the one or more missing parts of the one or more formal actions using the second machine learning model.

In some aspects of an embodiment of the present invention, a processor requests feedback from the user regarding the one or more formal actions with the one or more missing parts. A processor enables the user to review the one or more formal actions with the one or more missing parts. A processor enables the user to revise the one or more formal actions with the one or more missing parts manually through an iterative dialog system. A processor updates the formal planning model with the one or more missing parts. A processor updates a database with the one or more missing parts.

In some aspects of an embodiment of the present invention, the executable plan is the sequence of the one or more formal actions instructing the user how to achieve the goal state.

In some aspects of an embodiment of the present invention, a processor maps the one or more formal actions of the executable plan to the one or more executable scripts until all of the one or more formal actions of the executable plan have a corresponding executable script. A processor produces the executable plan by linking together the one or more formal actions in such a way that will satisfy the goal.

In some aspects of an embodiment of the present invention, a processor selects the one or more formal actions of the executable plan with a missing executable script. A processor enables the user to provide the missing executable script. A processor updates the database with the missing executable script provided by the user.

DETAILED DESCRIPTION

Figure 1:
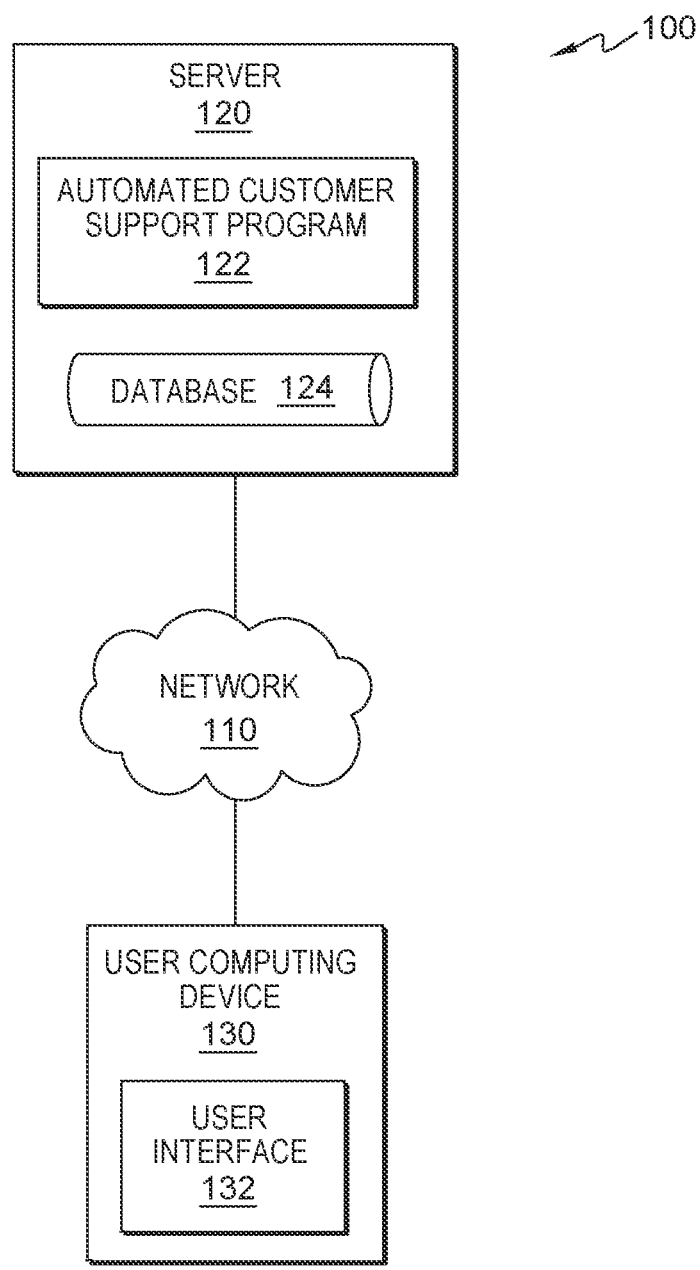
FIG. 1 is a functional block diagram illustrating a distributed data processing environment, in accordance with an embodiment of the present invention.

Embodiments of the present invention recognize that the customer support system has streamlined the customer service process by automating the help desk's ticketing process using IT ticketing software. Embodiments of the present invention recognize that IT ticketing software leverages AI and NLP in order to provide automated workflows and resolutions of incidents and service requests logged as IT support tickets. Embodiments of the present invention recognize that each IT support ticket documents all of the relevant information pertaining to the issue that needs to be resolved or the service that is required to be completed by the customer service team. Embodiments of the present invention recognize that the IT ticketing software leverages multiple channels to collect and log IT support tickets, including emails, phone calls, self-service portals, mobile applications, live chats, chatbots, and integration with third-party applications. Embodiments of the present invention recognize that the IT ticketing software routes the IT support tickets throughout their life cycle depending on the pre-defined workflows and automations to which they are subjected. Thus, embodiments of the present invention recognize the need to find a way to extract symbolic knowledge (i.e., Planning Domain Description Language (PDDL)) from an IT support ticket.

Embodiments of the present invention provide a system and method to extract an initial state, a goal state, and one or more actions from a set of sentences received from a natural language conversation occurring between an IT support system and a user through the one or more channels used to log IT support tickets.

Embodiments of the present invention provide a system and method to create a formal planning model with one or more formal actions written in PDDL text. PDDL is a formal knowledge representation language designed to express planning tasks. Developed as a means of facilitating system comparison, PDDL has become a de-facto standard input language of many planning systems. The components of a PDDL planning task include objects (i.e., things in the world that interest us), predicates (i.e., facts that we are interested in, e.g., properties of objects, which can be true or false), an initial state (i.e., the state of the world we start in, i.e., things that are true at the start), a goal state (i.e., the state of the world we want to be true at the end), and actions (i.e., the way of changing the state of the world, i.e., things that happen that change the facts). The planning tasks specified in PDDL are separated into two files: (1) a domain file, which contains predicates and actions, and (2) a problem file, which contains objects, the initial state, and the goal state.

Embodiments of the present invention provide a system and method to complete the one or more formal actions that are incomplete and updates the formal planning model. Embodiments of the present invention provide a system and method to produce and implement an executable plan.

Embodiments of the present invention provide a system and method to produce an executable plan to achieve the desired goal (i.e., the goal state) by linking together one or more formal actions, while inferring some actions which may not be mentioned explicitly in the text. Embodiments of the present invention provide a system and method to correct and update certain actions of the plan. Embodiments of the present invention provide a system and method to apply the executable plan to the IT support system.

Implementation of embodiments of the present invention may take a variety of forms, and exemplary implementation details are discussed subsequently with reference to the Figures.

FIG. 1 is a functional block diagram illustrating a distributed data processing environment, generally designated 100, in accordance with an embodiment of the present invention. In the depicted embodiment, distributed data processing environment 100 includes server 120 and user computing device 130, interconnected over network 110. Distributed data processing environment 100 may include additional servers, computers, computing devices, IoT sensors, and other devices not shown. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 120, user computing device 130, and other computing devices (not shown) within distributed data processing environment 100.

Server 120 operates to run automated customer support program 122 and to send and/or store data in database 124. In an embodiment, server 120 can send data from database 124 to user computing device 130. In an embodiment, server 120 can receive data in database 124 from user computing device 130. In an embodiment, server 120 can be a stand-alone computing device, a management server, a web server, a mobile computing device, or any other electronic device or computing system capable of receiving, sending, and processing data and capable of communicating with user computing device 130 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 3.

Automated customer support program 122 operates to extract an initial state, a goal state, and one or more actions from a set of sentences received from a natural language conversation occurring between an IT support system and a user through the one or more channels used to log IT support tickets. Automated customer support program 122 operates to create a formal planning model. Automated customer support program 122 operates to complete the one or more formal actions that are incomplete and updates the formal planning model. Automated customer support program 122 operates to produce and implement an executable plan.

In the depicted embodiment, automated customer support program 122 is a standalone program. In another embodiment, automated customer support program 122 may be integrated into another software product, such as an IT support software package. In the depicted embodiment, automated customer support program 122 resides on server 120. In another embodiment, automated customer support program 122 may reside on user computing device 130 or on another computing device (not shown), provided that automated customer support program 122 has access to network 110. The operational steps of automated customer support program 122 are depicted and described in further detail with respect to FIG. 2.

Database 124 operates as a repository for data received, used, and/or generated by automated customer support program 122. A database is an organized collection of data. Data includes, but is not limited to, information about user preferences (e.g., general user system settings for user computing device 130); information about alert notification preferences; one or more formal actions; executable scripts; executable plans; and any other data received, used, and/or generated by automated customer support program 122. Database 124 can be implemented with any type of device capable of storing data and configuration files that can be accessed and utilized by server 120, such as a hard disk drive, a database server, or a flash memory. In an embodiment, database 124 is accessed by automated customer support program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that automated customer support program 122 has access to database 124.

A user preference is a setting that can be customized for a particular user. A set of default user preferences are assigned to each user of automated customer support program 122. A user preference editor can be used to update values to change the default user preferences. User preferences that can be customized include, but are not limited to, general user system settings, alert notification settings, and machine-learned data collection and storage settings. Machine-learned data includes, but is not limited to, data regarding past results of iterations of automated customer support program 122 and a user's previous response to an alert notification sent by automated customer support program 122. Machine-learned data comes from automated customer support program 122 self-learning how to automatically extract the initial state, the goal state, and the problem domain from a set of sentences received from a natural language conversation occurring between the IT support system and a user through the one or more channels used to log IT support tickets; self-learning how to create a formal planning model; self-learning how to complete the one or more formal actions that are incomplete and update the formal planning model; and self-learning how to produce and implement an executable plan. Automated customer support program 122 self-learns by tracking user activity and improves with each iteration of automated customer support program 122.

User computing device 130 operates to run user interface 132 through which a user can interact with automated customer support program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running user interface 132 and of communicating (i.e., sending and receiving data) with automated customer support program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of user interface 132. User computing device 130 may include components as described in further detail in FIG. 3.

User interface 132 operates as a local user interface between automated customer support program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from automated customer support program 122 to a user via network 110. User interface 132 can also display or present alerts including information (such as graphics, text, and/or sound) sent from automated customer support program 122 to a user via network 110. In an embodiment, user interface 132 is capable of sending and receiving data (i.e., to and from automated customer support program 122 via network 110, respectively). Through user interface 132, a user can set user preferences and alert notification preferences.

Figure 2:
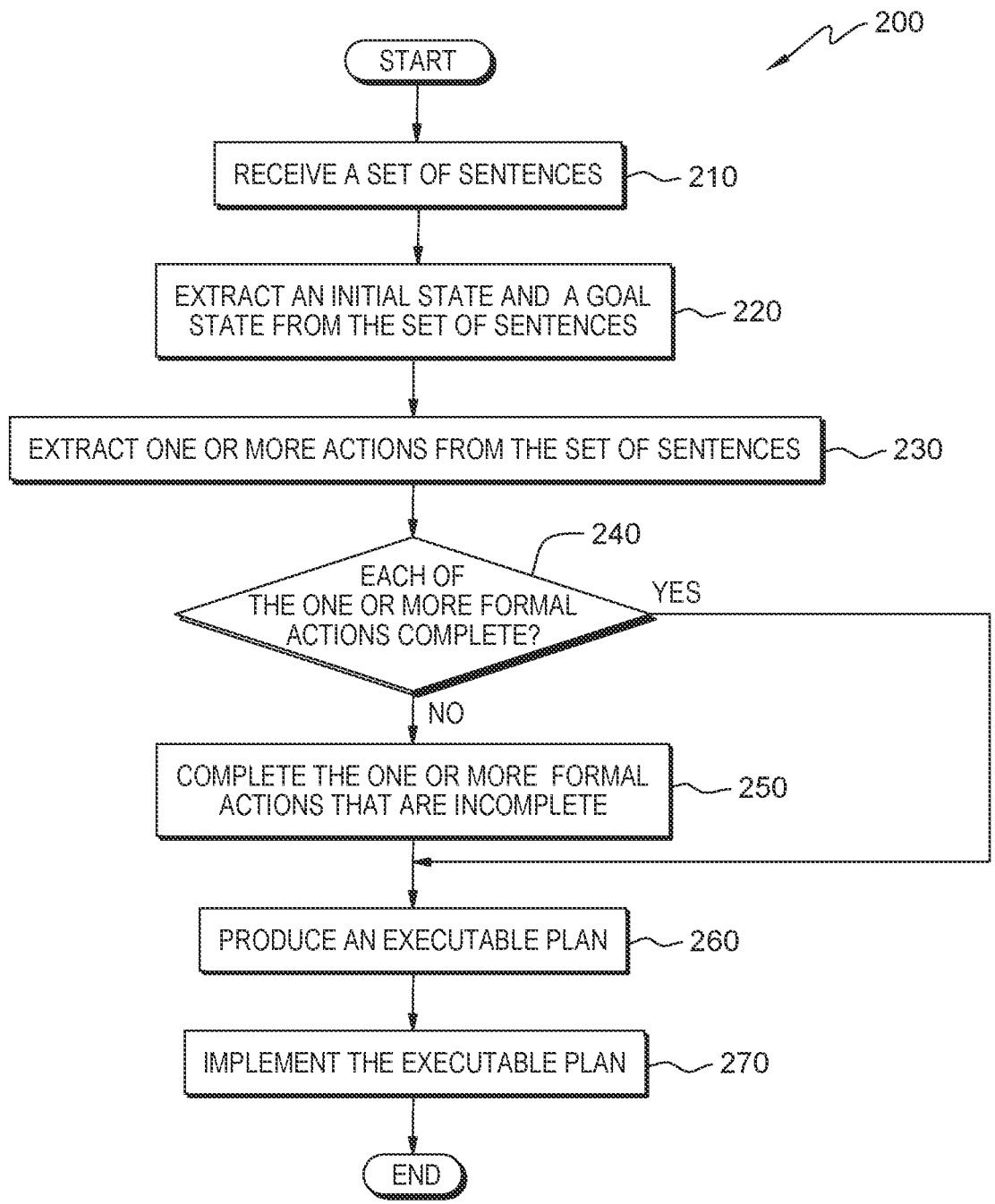
FIG. 2 is a flowchart illustrating the operational steps of an automated customer support program, on a server within the distributed data processing environment of FIG. 1, in accordance with an embodiment of the present invention.

FIG. 2 is a flowchart, generally designated 200, illustrating the operational steps of automated customer support program 122 on server 120 in distributed data processing environment 100 of FIG. 1, in accordance with an embodiment of the present invention. In an embodiment, automated customer support program 122 operates to extract an initial state, a goal state, and one or more actions from a set of sentences received from a natural language conversation occurring between an IT support system and a user through the one or more channels used to log IT support tickets. In an embodiment, automated customer support program 122 creates a formal planning model. In an embodiment, automated customer support program 122 completes the one or more formal actions that are incomplete and updates the formal planning model. In an embodiment, automated customer support program 122 produces and implements an executable plan. It should be appreciated that the process depicted in FIG. 2 illustrates one possible iteration of automated customer support program 122, which may be repeated after a conversation between an IT support system and a user is logged by automated customer support program 122.

In step 210, automated customer support program 122 receives a set of sentences. In an embodiment, automated customer support program 122 receives a set of sentences extracted from a natural language conversation occurring between an IT support system and a user through one or more channels used to log IT support tickets. The one or more channels used to log IT support tickets includes, but is not limited to, emails, phone calls, self-service portals, mobile applications, live chats, chatbots, and integration with third-party applications. In an embodiment, automated customer support program 122 receives a set of sentences in natural language format. In an embodiment, automated customer support program 122 receives a set of sentences describing an initial state and a goal state. The initial state describes the state from where automated customer support program 122 starts, i.e., the state of the IT issue when logged in the IT support ticket. The goal state describes the state where automated customer support program 122 wants to end, i.e., the state after the IT issue is solved and the IT support ticket is closed. In an embodiment, automated customer support program 122 receives a set of sentences describing a problem domain. The problem domain is a formal description of the planning actions corresponding to the steps allowed in the domain with their preconditions and effects, i.e., the one or more actions required to be executed to achieve the goal state, i.e., the one or more actions required to be executed to solve the IT issue and to close the IT support ticket. The problem domain will hereinafter be referred to as "the one or more actions".

For example, automated customer support program 122 receives a set of sentences extracted from a natural language conversation occurring between the IT support system and a user through a chatbot, a channel used to log IT support tickets. The user's issue, i.e., the index IDX1 in partition P1 in database DB2_D1 is broken and needs to be rebuilt, is described in the set of sentences. The steps required to be executed to resolve the user's issue is also described in the set of sentences: "Step 1 is to login to the database using administrative credentials. Step 2 is to join tables T2 and T4 together on fields T2.fieldA and T4.fieldC. Step 4 is to create index IDX1 on fieldD of the previous join. Step 5 is to run the maintenance SQL procedure maintain( ) before creating index IDX1. Step 6 is to logout." The problem is that Step 3 (to delete the previous index IDX1) is not explicitly mentioned.

In step 220, automated customer support program 122 extracts an initial state and a goal state from the set of sentences. In an embodiment, responsive to receiving a set of sentences, automated customer support program 122 extracts an initial state and a goal state from the set of sentences. In an embodiment, customer support program 122 extracts an initial state and a goal state from the set of sentences using a Natural Language Classifier (NLC). The NLC is trained on labeled examples of the initial state and the goal state. The NLC allows a user to classify text into custom categories, at scale. The NLC utilizes an ensemble of classification models, along with unsupervised and supervised learning techniques, to achieve high accuracy levels.

After the training data is assembled, the NLC evaluates the data against multiple support vector machines and a convolutional neural network using deep learning. Continuing the above example, automated customer support program 122 identifies the initial state to be a broken index, IDX1, in partition P1 in database DB2_D1 and identifies the goal state to be a properly functioning index.

In an embodiment, automated customer support program 122 runs a seq2seq model. In an embodiment, automated customer support program 122 runs a seq2seq model on the sentence identified as the initial state and on the sentence identified as the goal state. The seq2seq model translates the sentence identified as the initial state and the sentence identified as the goal state into a logical expression. A logical expression is grounded with one or more objects, i.e., the named entities extracted from the sentence. In an embodiment, automated customer support program 122 adds a corresponding logical expression to the sentence identified as the initial state and to the sentence identified as the goal state, e.g., IS if the sentence is an initial state or GS if the sentence is a goal state.

In step 230, automated customer support program 122 extracts the one or more actions from the set of sentences. In an embodiment, responsive to identifying the initial state and the goal state from the set of sentences, automated customer support program 122 extracts the one or more actions from the set of sentences. In an embodiment, automated customer support program 122 extracts a name of each of the one or more actions from the set of sentences. In an embodiment, automated customer support program 122 extracts a reason for taking the one or more actions from the set of sentences. Continuing the above example, automated customer support program 122 extracts the one or more actions from the set of sentences. The one or more actions include logging in to the database using administrative credentials, joining tables T2 and T4 together on fields T2.fieldA and T4.fieldC, creating index IDX1 on fieldD of the previous join, running the maintenance SQL procedure maintain( )before creating index IDX1, and logging out.

In an embodiment, automated customer support program 122 runs a semantic parser (e.g., verbnet) on the set of sentences. In an embodiment, automated customer support program 122 runs a semantic parser on the set of sentences to detect state transitions when the one or more actions are applied. In an embodiment, automated customer support program 122 extracts the pre-conditions and effects of the one or more actions from the set of sentences. In one or more embodiments, automated customer support program 122 sets the pre-conditions and effects of the one or more actions based on the state transitions detected. Continuing the above example, automated customer support program 122 identifies a pre-condition to the first action to be executed to fix the problem, i.e., logging into the database. The pre-condition identified is to obtain administrative credentials.

In an embodiment, automated customer support program 122 adopts a PDDL form of representation of the set of sentences. In an embodiment, automated customer support program 122 formalizes the set of sentences by converting the one or more actions from the set of sentences into one or more formal actions written in PDDL text. In an embodiment, automated customer support program 122 incorporates the name of the one or more actions, the reason for taking the one or more actions into the one or more formal actions, and the pre-conditions and effects of the one or more actions. In an embodiment, automated customer support program 122 creates a formal planning model. In an embodiment, automated customer support program 122 creates a formal planning model with the initial state, the goal state, and the one or more formal actions.

In decision 240, automated customer support program 122 determines whether each of the one or more formal actions included in the formal planning model is complete. In an embodiment, responsive to extracting the one or more actions from the set of sentences, automated customer support program 122 determines whether each of the one or more formal actions included in the formal planning model is complete. In an embodiment, automated customer support program 122 determines whether each of the one or more formal actions included in the formal planning model is complete using a machine learning model. The machine learning model is trained on a dataset containing examples of complete and incomplete formal actions and can predict whether each of the one or more formal actions is complete or incomplete.

If automated customer support program 122 determines that each of the one or more formal actions included in the formal planning model are complete (decision 240, YES branch), then automated customer support program 122 produces an executable plan (step 260). If automated customer support program 122 determines that each of the one or more formal actions included in the formal planning model are not complete (decision 240, NO branch), then automated customer support program 122 completes the one or more formal incomplete actions (step 250).

For example, automated customer support program 122 determines the process of mapping text to action descriptions is not complete because the actions are not complete. Automated customer support program 122 must complete the formal actions by comparing or leveraging a database of previously extracted actions which are corrected or are assumed to be correct. Automated customer support program 122 must complete the formal actions by training a new model that predicts how to complete an action description.

In step 250, automated customer support program 122 completes the one or more formal actions that are incomplete. In an embodiment, responsive to determining that each of the one or more formal actions are not complete, then automated customer support program 122 completes the one or more formal actions that are incomplete. In an embodiment, automated customer support program 122 completes the one or more formal actions that are incomplete based on the initial state and the goal state. In an embodiment, automated customer support program 122 completes the one or more formal actions that are incomplete using a machine learning model. The machine learning model is trained on a dataset containing complete and incomplete formal actions using an encoder-decoder deep learning model and can predict the one or more missing parts of the one or more formal actions that are incomplete. The machine learning model leverages existing formal actions stored in a database, e.g., database 124. In an embodiment, automated customer support program 122 completes the one or more formal actions that are incomplete with an existing formal action from a database, e.g., database 124.

In an embodiment, automated customer support program 122 requests feedback from the user. In an embodiment, automated customer support program 122 requests feedback from the user through user interface 132 of user computing device 130. In an embodiment, automated customer support program 122 requests feedback regarding the one or more formal actions that were completed. In an embodiment, automated customer support program 122 requests feedback in order to automatically correct the one or more formal actions that are not complete. In an embodiment, automated customer support program 122 enables a user to review the one or more formal actions that are not complete. In an embodiment, automated customer support program 122 enables a user to revise the one or more formal actions that are not complete manually through an iterative dialog system. In an embodiment, automated customer support program 122 enables a user to interact with the iterative dialog system through user interface 132 of user computing device 130. For example, automated customer support program 122 presents a formal action to a user and requests feedback from the user on whether the formal action is complete or incomplete. Subsequently, the user can label the action as complete or incomplete. If the action is incomplete, the user can label the action as incomplete and provide a reason why the action is incomplete, e.g., the action is missing a pre-condition or the action produces the wrong effect. In addition, the user can provide the complete action.

In an embodiment, automated customer support program 122 uses the feedback to learn to automatically identify an incomplete action and subsequently to generate the correct complete action. In an embodiment, automated customer support program 122 uses the feedback to improve automated customer support program 122 in producing an executable plan. In an embodiment, automated customer support program 122 uses the feedback to improve automated customer support program 122 in producing an executable plan using a recommendation system. Recommendation systems include, but are not limited to, reinforcement learning, machine learning, collaborative filtering, matrix decomposition, clustering, and/or any deep learning approach.

In an embodiment, automated customer support program 122 produces one or more completed formal actions. In an embodiment, automated customer support program 122 updates the formal planning model with the one or more completed formal actions. In an embodiment, automated customer support program 122 updates the database, e.g., database 124, with the one or more completed formal actions.

In step 260, automated customer support program 122 produces an executable plan. In an embodiment, responsive to completing the one or more formal actions that are incomplete, automated customer support program 122 produces an executable plan. In an embodiment, automated customer support program 122 produces an executable plan using a planner. The planner is an algorithm that, when given an initial state, a goal state, and a set of actions, computes an executable plan. The executable plan is a sequence of one or more formal actions instructing the user how to achieve the goal state. In an embodiment, automated customer support program 122 produces an executable plan. In an embodiment, automated customer support program 122 produces an executable plan by linking together the one or more formal actions in such a way that will achieve the goal state. Continuing the above example, automated customer support program 122 produces an executable plan to fix the index IDX1 in partition P1 of the user's database DB2_D1. The executable plan involves the steps to rebuild the index.

In an embodiment, automated customer support program 122 maps the one or more formal actions of the executable plan. In an embodiment, automated customer support program 122 maps the one or more formal actions of the executable plan to executable scripts. The executable script is a code that can be executed on a user computing device. In an embodiment, automated customer support program 122 maps the one or more formal actions of the executable plan until all of the one or more formal actions of the executable plan have a corresponding script. In an embodiment, automated customer support program 122 selects the one or more formal actions of the executable plan with a missing executable script. In an embodiment, automated customer support program 122 enables the user to provide the missing executable scripts. In an embodiment, automated customer support program 122 adds the missing executable scripts to a database, e.g., database 124.

In step 270, automated customer support program 122 implements the executable plan. In an embodiment, responsive to automated customer support program 122 producing an executable plan, automated customer support program 122 implements the executable plan. In an embodiment, automated customer support program 122 implements the executable plan using a plan executor. In an embodiment, automated customer support program 122 implements the executable plan by executing the scripts. In an embodiment, automated customer support program 122 executes the scripts according to the sequences of actions in the executable plan. In an embodiment, automated customer support program 122 executes the scripts on user computing device 130. In another embodiment, automated customer support program 122 enables the user to implement the executable plan. In an embodiment, automated customer support program 122 enables the user to implement the executable plan manually on user computing device 130. In an embodiment, automated customer support program 122 outputs the executable plan to the user as an alert notification. In an embodiment, automated customer support program 122 outputs the executable plan to the user as an alert notification through user interface 132 of user computing device 130. In an embodiment, automated customer support program 122 stores the executable plan. In an embodiment, automated customer support program 122 stores the executable plan in a database, e.g., database 124.

Figure 3:
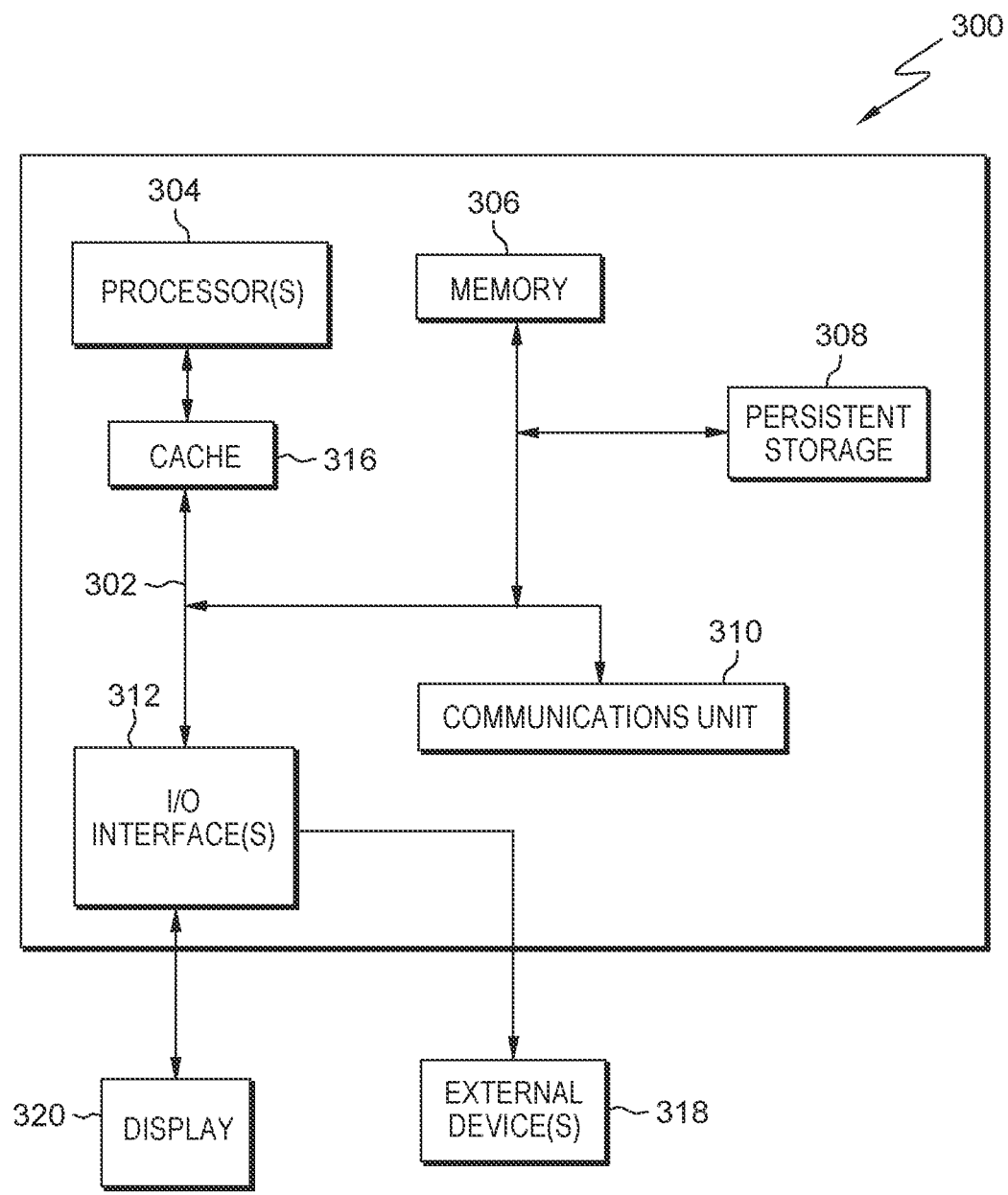
FIG. 3 is a block diagram illustrating the components of a computing device in the distributed data processing environment of FIG. 1, in accordance with an embodiment of the present invention.

FIG. 3 is a block diagram illustrating the components of computer system 300, suitable for server 120 and/or user computing device 130 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Computer system 300 includes processor(s) 304, memory 306, cache 316, communications fabric 302, persistent storage 308, input/output (I/O) interface(s) 312, and communications unit 310.

Communications fabric 302 provides communications between memory 306, cache 316, persistent storage 308, input/output (I/O) interface(s) 312, and communications unit 310. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a cross switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Program instructions and data (e.g., software and data 314) used to practice embodiments of the present invention may be stored in persistent storage 308 and in memory 306 for execution and/or access by one or more of the respective processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308. Software and data 314 can be stored in persistent storage 308 for access and/or execution by one or more of the respective processor(s) 304 via cache 316. With respect to user computing device 130, software and data 314 includes user interface 132. With respect to server 120, software and data 314 includes automated customer support program 122.

Communications unit 310, in these examples, provides for communications with other data processing systems or devices. In these examples, communications unit 310 includes one or more network interface cards. Communications unit 310 may provide communications through the use of either or both physical and wireless communications links. Program instructions and data (e.g., software and data 314) used to practice embodiments of the present invention may be downloaded to persistent storage 308 through communications unit 310.

I/O interface(s) 312 allows for input and output of data with other devices that may be connected to server 120 and/or user computing device 130. For example, I/O interface(s) 312 may provide a connection to external device(s) 318, such as a keyboard, a keypad, a touch screen, and/or some other suitable input device. External device(s) 318 can also include portable computer readable storage media, such as, for example, thumb drives, portable optical or magnetic disks, and memory cards. Program instructions and data (e.g., software and data 314) used to practice embodiments of the present invention can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

While particular embodiments of the present invention have been shown and described here, it will be understood to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understand, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "at least one" or "one or more" and indefinite articles such as "a" or "an", the same holds true for the use in the claims of definite articles.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each flowchart illustration and/or block of the block diagrams, and combinations of flowchart illustration and/or blocks in the block diagrams, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for an automated information technology ("IT") support system, the computer-implemented method comprising:
    receiving, by one or more processors, a set of sentences extracted from a natural language conversation occurring between an IT support system and a user through a channel used to log an IT support ticket;
    extracting, by the one or more processors, an initial state and a goal state from the set of sentences using a Natural Language Classifier, wherein-the Natural Language Classifier evaluates the set of sentences against a plurality of support vector machines and a convolutional neural network based on a first deep learning model;
    extracting, by the one or more processors, one or more actions from the set of sentences;
    converting, by the one or more processors, the one or more actions into one or more into corresponding planning design description language ("PDDL") text formal actions;
    creating, by the one or more processors, a formal planning model incorporating the extracted initial state, the goal state, and the one or more formal actions, based on the converted PDDL text;
    determining, by the one or more processors, whether at least one of the one or more formal actions are not complete based on a first machine learning model;
    responsive to determining the at least one of the one or more formal actions are not complete, completing, by the one or more processors, the one or more formal actions with one or more missing parts using the first machine learning model enabled to predict the one or more missing parts of the at least one of the one or more formal actions that are not complete to produce one or more complete formal actions;
    generating, by the one or more processors, an executable plan to move from the initial state to the goal state by mapping the one or more complete formal actions to one or more executable scripts, wherein an executable script is a code that can be executed on a computing device; and
    executing, by the one or more processors, the one or more executable scripts according to the sequence of the one or more complete formal actions.

2. The computer-implemented method of claim 1, wherein extracting the initial state and the goal state from the set of sentences using the Natural Language Classifier further comprises:
    running, by the one or more processors, a seq2seq model that translates a sentence identified as the initial state and a sentence identified as the goal state into a logical expression; and
    adding, by the one or more processors, a corresponding logical expression to the sentence identified as the initial state and a corresponding logical expression to the sentence identified as the goal state.

3. The computer-implemented method of claim 1, wherein extracting the one or more actions from the set of sentences further comprises:
    extracting, by the one or more processors, a name of each of the one or more actions from the set of sentences;
    extracting, by the one or more processors, a reason for taking each of the one or more actions from the set of sentences;
    running, by the one or more processors, a semantic parser on the set of sentences to detect state transitions when the one or more actions from the set of sentences are applied; and
    extracting, by the one or more processors, one or more pre-conditions and one or more effects of the one or more actions from the set of sentences.

4. The computer-implemented method of claim 1, wherein completing the one or more formal actions with the one or more missing parts using the first machine learning model enabled to predict the one or more missing parts of the at least one of the one or more formal actions that are not complete to produce the one or more complete formal actions further comprises:
    requesting, by the one or more processors, feedback from the user regarding the one or more formal actions with the one or more missing parts;
    enabling, by the one or more processors, the user to review the one or more formal actions with the one or more missing parts;
    enabling, by the one or more processors, the user to revise the one or more formal actions with the one or more missing parts manually through an iterative dialog system;
    updating, by the one or more processors, the formal planning model with the one or more missing parts; and
    updating, by the one or more processors, a database with the one or more missing parts.

5. The computer-implemented method of claim 1, wherein producing the executable plan to move from the initial state to the goal state by mapping the one or more complete formal actions to the one or more executable scripts further comprises:
    mapping, by the one or more processors, the one or more complete formal actions of the executable plan to the one or more executable scripts until all of the one or more complete formal actions of the executable plan have a corresponding executable script; and producing, by the one or more processors, the executable plan by linking together the one or more complete formal actions in such a way that will satisfy the goal state.

6. The computer-implemented method of claim 5, wherein mapping the one or more complete formal actions of the executable plan to the one or more executable scripts until all of the one or more complete formal actions of the executable plan have the corresponding executable script further comprises:
   selecting, by the one or more processors, the one or more complete formal actions of the executable plan with a missing executable script;
   enabling, by the one or more processors, the user to provide the missing executable script; and
   updating, by the one or more processors, the database with the missing executable script provided by the user.

7. The computer-implemented method of claim 1, wherein the first deep learning model is an encoder-decoder deep learning model.

8. The computer-implemented method of claim 1, wherein the first machine learning model is trained using at least one set of machine-learned data, wherein the machine-learned data is collected from self-learning.

9. A computer program product for an automated information technology ("IT") support system, the computer program product comprising:
   one or more non-transitory computer readable storage media and program instructions stored on the one or more non-transitory computer readable storage media, the program instructions comprising:
   program instructions to receive a set of sentences extracted from a natural language conversation occurring between an IT support system and a user through a channel used to log an IT support ticket;
   program instructions to extract an initial state and a goal state from the set of sentences using a Natural Language Classifier, wherein the the Natural Language Classifier evaluates the set of sentences against a plurality of support vector machines and a convolutional neural network based on a first deep learning model;
   program instructions to extract one or more actions from the set of sentences;
   program instructions to convert the one or more actions into corresponding planning design description language ("PDDL") text formal actions;
   program instructions to create a formal planning model incorporating the extracted initial state, the goal state, and the one or more formal actions, based on the converted PDDL text;
   program instructions to determine whether at least one of the one or more formal actions are not complete based on a first machine learning model;
      responsive to determining the at least one of the one or more formal actions are not complete, program instructions to complete the one or more formal actions with one or more missing parts using the first machine learning model enabled to predict the one or more missing parts of the at least one of the one or more formal actions that are not complete to produce one or more complete formal actions;
   program instructions to generate an executable plan to move from the initial state to the goal state by mapping the one or more complete formal actions to one or more executable scripts, wherein an executable script is a code that can be executed on a computing device; and
   program instructions to execute the one or more executable scripts according to the sequence of the one or more complete formal actions.

10. The computer program product of claim 9, wherein the program instructions to extract the one or more actions from the set of sentences further comprises:
   program instructions to extract a name of each of the one or more actions from the set of sentences;
   program instructions to extract a reason for taking each of the one or more actions from the set of sentences;
   program instructions to run a semantic parser on the set of sentences to detect state transitions when the one or more actions are applied; and
   program instructions to extract one or more pre-conditions and one or more effects of the one or more actions.

11. The computer program product of claim 9, wherein the program instructions to complete the one or more formal actions with the one or more missing parts using the first machine learning model enabled to predict the one or more missing parts of the at least one of the one or more formal actions that are not complete to produce the one or more complete formal actions further comprises:
   program instructions to request feedback from the user regarding the one or more formal actions with the one or more missing parts;
   program instructions to enable the user to review the one or more formal actions with the one or more missing parts;
   program instructions to enable the user to revise the one or more formal actions with the one or more missing parts manually through an iterative dialog system;
   program instructions to update the formal planning model with the one or more missing parts; and
   program instructions to update a database with the one or more missing parts.

12. The computer program product of claim 9, wherein the program instructions to produce the executable plan to move from the initial state to the goal state by mapping the one or more complete formal actions to the one or more executable scripts further comprises:
   program instructions to map the one or more complete formal actions of the executable plan to one or more executable scripts until all of the one or more complete formal actions of the executable plan have a corresponding executable script; and
   program instructions to produce the executable plan by linking together the one or more complete formal actions in such a way that will satisfy the goal state.

13. The computer program product of claim 12, wherein the program instructions to map the one or more complete formal actions of the executable plan to the one or more executable scripts until all of the one or more complete formal actions of the executable plan have the corresponding executable script further comprises:
   program instructions to select the one or more complete formal actions of the executable plan with a missing executable script;
   program instructions to enable the user to provide the missing executable script; and
   program instructions to update the database with the missing executable script provided by the user.

14. A computer system for an automated information technology ("IT") support system, the computer system comprising:
   one or more computer processors;
   one or more non-transitory computer readable storage media;

program instructions collectively stored on the one or more non-transitory computer readable storage media for execution by at least one of the one or more computer processors, the stored program instructions comprising:

program instructions to receive a set of sentences extracted from a natural language conversation occurring between an IT support system and a user through a channel used to log an IT support ticket;

program instructions to extract an initial state and a goal state from the set of sentences using a Natural Language Classifier, wherein the Natural Language Classifier evaluates the set of sentences against a plurality of support vector machines and a convolutional neural network using a first deep learning model;

program instructions to extract one or more actions from the set of sentences;

program instructions to convert the one or more actions into corresponding planning design description language ("PDDL") text formal actions;

program instructions to create a formal planning model incorporating the extracted initial state, the goal state, and the one or more formal actions, based on the converted PDDL text;

program instructions to determine whether at least one of the one or more formal actions are not complete based on a first machine learning model;

responsive to determining the at least one of the one or more formal actions are not complete, program instructions to complete the one or more formal actions with one or more missing parts using the first machine learning model enabled to predict the one or more missing parts of the at least one of the one or more formal actions that are not complete to produce one or more complete formal actions;

program instructions to generate an executable plan to move from the initial state to the goal state by mapping the one or more complete formal actions to one or more executable scripts, wherein an executable script is a code that can be executed on a computing device;

program instructions to execute the one or more executable scripts according to the sequence of the one or more complete formal actions.

15. The computer system of claim 14, wherein the program instructions to extract the one or more actions from the set of sentences further comprises:

program instructions to extract a name of each of the one or more actions from the set of sentences;

program instructions to extract a reason for taking each of the one or more actions from the set of sentences;

program instructions to run a semantic parser on the set of sentences to detect state transitions when the one or more actions are applied; and program instructions to extract one or more pre-conditions and one or more effects of the one or more actions.

16. The computer system of claim 14, wherein the program instructions to complete the one or more formal actions with the one or more missing parts using the first machine learning model enabled to predict the one or more missing parts of the at least one of the one or more formal actions that are not complete to produce the one or more complete formal actions further comprises:

program instructions to request feedback from the user regarding the one or more formal actions with the one or more missing parts;

program instructions to enable the user to review the one or more formal actions with the one or more missing parts;

program instructions to enable the user to revise the one or more formal with the one or more missing parts manually through an iterative dialog system;

program instructions to update the formal planning model with the one or more missing parts; and program instructions to update a database with the one or more missing parts.

17. The computer system of claim 14, wherein the program instructions to produce the executable plan to move from the initial state to the goal state by mapping the one or more complete formal actions to the one or more executable scripts further comprises:

program instructions to map the one or more complete formal actions of the executable plan to one or more executable scripts until all of the one or more complete formal actions of the executable plan have a corresponding executable script; and program instructions to produce the executable plan by linking together the one or more complete formal actions in such a way that will satisfy the goal state.

18. The computer system of claim 17, wherein the program instructions to map the one or more complete formal actions of the executable plan to the one or more executable scripts until all of the one or more complete formal actions of the executable plan have the corresponding executable script further comprises:

program instructions to select the one or more complete formal actions of the executable plan with a missing executable script;

program instructions to enable the user to provide the missing executable script; and program instructions to update the database with the missing executable script provided by the user.

* * * * *